US012066330B2

(12) United States Patent
Barel et al.

(10) Patent No.: US 12,066,330 B2
(45) Date of Patent: Aug. 20, 2024

(54) LIGHT SOURCE CLASSIFIER

(71) Applicant: Microsoft Technology Licensing, LLC, Redmond, WA (US)

(72) Inventors: Eliyahu Barel, Rosh HaAyin (IL); Arthur Gershfeld, Holon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 17/706,307

(22) Filed: Mar. 28, 2022

(65) Prior Publication Data

US 2023/0304864 A1 Sep. 28, 2023

(51) Int. Cl.
*G01J 3/50* (2006.01)
*G01J 3/51* (2006.01)
(Continued)

(52) U.S. Cl.
CPC .................. *G01J 3/505* (2013.01); *G01J 3/51* (2013.01); *G09G 3/2003* (2013.01); *G09G 2320/0666* (2013.01)

(58) Field of Classification Search
CPC .......... G01J 3/505; G01J 3/51; H04N 13/127; H04N 1/6019; H04N 1/6055; H04N 1/6027; H04N 1/6033; H04N 1/6086; H04N 1/6091; H04N 1/6088; H04N 5/57–58; H04N 9/73; H04N 9/77; G09G 3/2003; G09G 3/2011–2018; G09G 3/22; G09G 3/34; G09G 3/3413; G09G 5/10;
(Continued)

(56) References Cited

U.S. PATENT DOCUMENTS

2008/0246950 A1 10/2008 Ono
2011/0157416 A1 6/2011 Chen
(Continued)

FOREIGN PATENT DOCUMENTS

JP 2011064637 A 3/2011

OTHER PUBLICATIONS

Munir, et al., "Passive localization through light flicker fingerprinting", In IEEE Sensors Journal, vol. 19, Issue 24, Aug. 22, 2019, pp. 12137-12144.
(Continued)

*Primary Examiner* — Wesner Sajous
(74) *Attorney, Agent, or Firm* — Holzer Patel Drennan

(57) ABSTRACT

One or more display color characteristics of an electronic device are managed using a light detecting sensor configured to output multiple color channels in a predefined color space. The light detecting sensor in the electronic device senses ambient light and outputs measurements in visible color channels of the predefined color space to characterize the sensed ambient light. A ratio of one or more measurements of one of the visible color channels to one or more measurements of another of the visible color channels is determined. At least one light source generating at least a portion of the sensed ambient light is classified based at least in part on the determined ratio, wherein the determined ratio indicates a color temperature component of the sensed ambient light. The one or more display color characteristics of the electronic device are adjusted based at least in part on the classifying operation.

20 Claims, 7 Drawing Sheets

(51) Int. Cl.
*G09G 3/20* (2006.01)
*G09G 3/22* (2006.01)
*G09G 3/34* (2006.01)
*G09G 5/02* (2006.01)
*G09G 5/10* (2006.01)
*H04N 1/60* (2006.01)
*H04N 5/58* (2006.01)
*H04N 9/73* (2023.01)

(58) Field of Classification Search
CPC .......... G09G 2320/00; G09G 2320/02; G09G 2320/0271; G09G 2320/0666; G09G 2320/04; G09G 2320/0626; G09G 2320/0633; G09G 2320/064; G09G 2320/0693; G06T 2207/10052; G06T 2200/21; A47G 25/0635; A47G 29/10; G01S 17/08–36
USPC ....................................................... 345/618
See application file for complete search history.

(56) References Cited

U.S. PATENT DOCUMENTS

| | | | |
|---|---|---|---|
| 2014/0049573 A1* | 2/2014 | Ishihara | G09G 5/026 345/88 |
| 2016/0269656 A1 | 9/2016 | Tao et al. | |
| 2017/0076653 A1* | 3/2017 | Bell | G09G 3/007 |
| 2019/0172382 A1* | 6/2019 | Bell | G09G 3/007 |
| 2019/0301932 A1* | 10/2019 | Sarkar | G01J 3/465 |

OTHER PUBLICATIONS

Tran, Chau, "Simple circuit measures relative intensity of two light sourcesv", Retrieved from: https://evertiq.com/design/50008, May 28, 2021, 7 Pages.

* cited by examiner

LIGHT SOURCE CLASSIFIER

BACKGROUND

Operations of computer-based displays and cameras may rely on accurate sensing of light in the ambient environment. For example, modern displays get dimmer in a darker room and brighter in a well-lit room. Likewise, the exposure in an image capture may depend on the intensity of light in the ambient environment.

SUMMARY

The described technology manages one or more display color characteristics of an electronic device using a light detecting sensor configured to output multiple color channels in a predefined color space. The light detecting sensor in the electronic device senses ambient light and outputs measurements in visible color channels of the predefined color space to characterize the sensed ambient light. A ratio of one or more measurements of one of the visible color channels to one or more measurements of another of the visible color channels is determined. At least one light source generating at least a portion of the sensed ambient light is classified based at least in part on the determined ratio, wherein the determined ratio indicates a color temperature component of the sensed ambient light. The one or more display color characteristics of the electronic device are adjusted based at least in part on the classifying operation.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
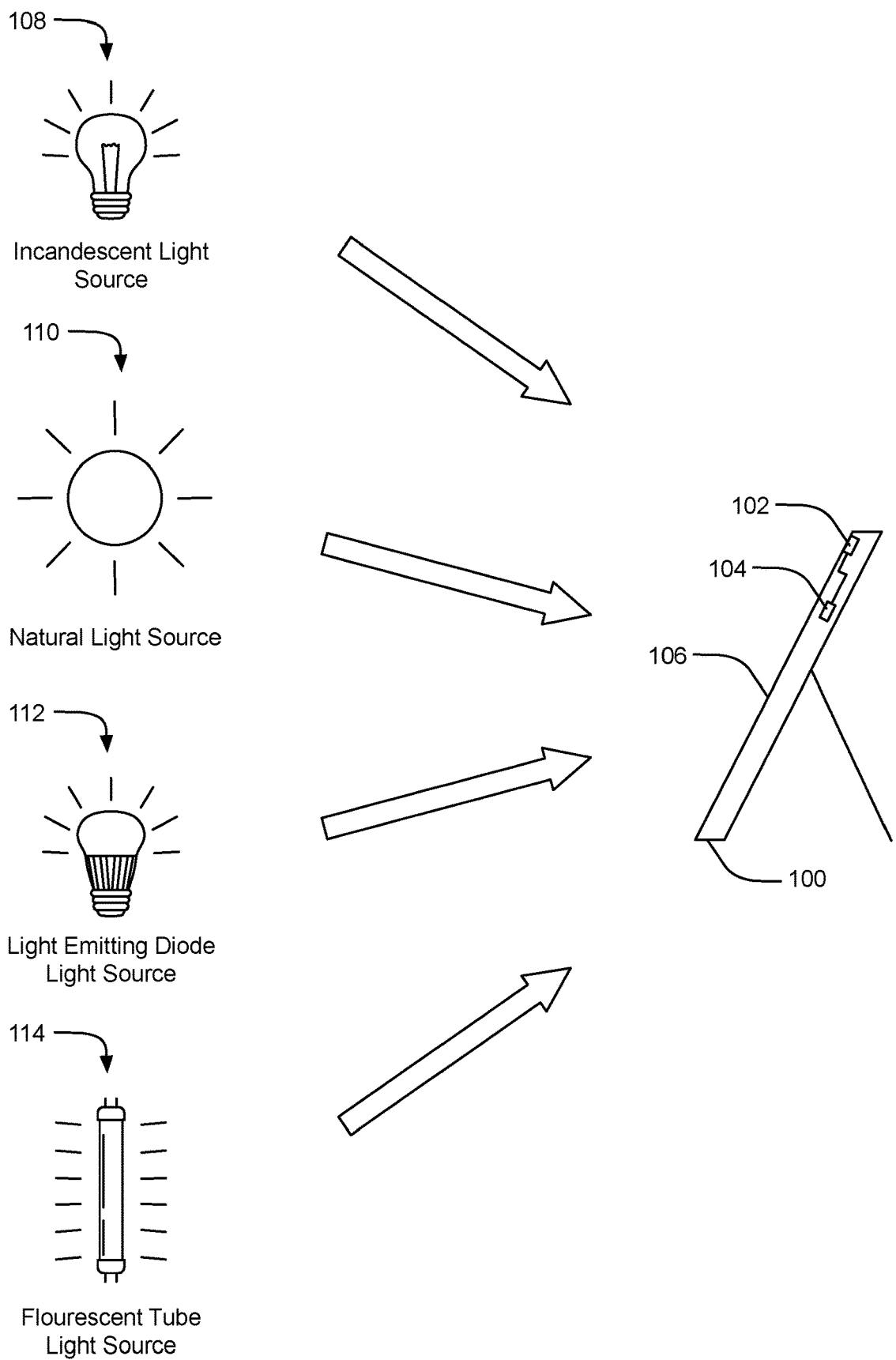
FIG. 1 illustrates an example electronic device with ambient color sensing (ACS) and light source classification.

The intensity of light in an ambient environment of an electronic device can influence the desired operation of a display or a light sensor of the device. However, the capabilities of such displays and sensors can also be influenced by the sources of the ambient light. For example, different light sources can emit different frequency distributions of the ambient light. Accordingly, some displays may color-shift their light emitters according to the frequency distribution of light in the ambient environment in an effort to reduce eye strain and improve clarity and readability. For example, using the described technology, a display can adjust its color characteristics to improve the user experience in the context of different light sources (e.g., shifting the display color to enhance red light compared to blue light when a halogen, incandescent, or low CCT LED (<4000K) light source dominates the ambient light collected by the light sensor). Likewise, the white balance of a captured image can depend on whether the ambient light is from a fluorescent bulb, an incandescent bulb, an LED, or the Sun. Accordingly, an electronic device can amplify or reduce the magnitude of color signals in select color channels from a sensor to achieve an accurate white balance during image capture. As such, accurately classifying the sources of ambient light can greatly improve the operation of displays and light sensors in electronic devices.

Improvements in light source classification can be achieved using a combination of light sensing, such as ambient color sensing (ACS), and one or more light source classification processing operations. Light sensors, such as ACS sensors, can operate in predefined color spaces (e.g., which can characterize quantitative links between distribution of wavelengths in the visible electromagnetic spectrum and physiologically perceived colors in a human color vision), such as CIE 1931 RGB (Red, Green, Blue) color space or the CIE 1931 XYZ color space, although other color spaces may be supported (e.g., the 1976 CIELUV color space). ACS sensors may also output color channels indicating infrared light and/or ultraviolet light (e.g., invisible light with respect to human vision), which can also be characterized within a predefined color space. One or more ACS sensors associated with an electronic device can detect the frequency distributions of ambient light, such as across six different independent color channels (e.g., Red, Green, Blue, near-Infrared, UVA, and Clear), although other color channels and combination are contemplated. In one implementation, the CIE 1931 color space defines the tristimulus values of X, Y, and Z, wherein Y is the luminance, Z is quasi-equal to blue (of CIE RGB), and X is a mix of the three CIE RGB curves chosen to be nonnegative.

It should be understood that some light sensors, such as an ACS sensor, can measure light in both a visible spectrum (e.g., RBG, XYZ) and an invisible spectrum (e.g., infrared, ultraviolet). Different light sensors can output these measurements with respect to the visible and/or invisible wavelengths. In some implementations, measurements from an invisible spectrum can be used in combination with measurements from a visible spectrum to enhance the performance and accuracy of a light sensor when classifying ambient light sources.

The color channel measurements output by one or more light sensors can then be post-processed using a combination of PWM patterns, intra-channel relationships (e.g., ratios), and/or predefined light source profiles to accurately classify the light sources in the ambient environment of the electronic device. In one implementation, the predefined light source profiles are represented by a conversion matrix model that is trained on numerous known light sources and the corresponding ambient light generated from such light sources. The conversion matrix model can then generate a look-up table of light source profiles as a function of one or more of color temperature, visible light channel ratios, invisible/visible light channel ratios, flicker, and various combinations of light channel values, flicker, and/or color temperature. As described herein, a relatively inexpensive and power-efficient ACS sensor (as compared to a much more expensive camera image sensor, for example) can provide a rich classification of ambient light sources using such post-processing of color channel data, thereby allowing an electronic device to adjust the display and/or light sensor operation according to the identified light sources.

FIG. 1 illustrates an example electronic device 100 with ambient color sensing (ACS) and light source classification. The electronic device 100 includes an ACS sensor 102 capable of detecting and measuring colored light (human-visible and/or human-invisible) and outputting light measurements of the detected light in distinct output color channels. The light measurements are communicated to a light classification subsystem 104 of the electronic device 100. The light classification subsystem 104 may be implemented in a combination of hardware and software (e.g., completely in circuitry or in a combination of software, one or more hardware processors, and/or other processing circuitry). The electronic device 100 also includes a display 106 and may include one or more additional light sensors (e.g., one or more image capture sensors).

As shown in FIG. 1, the ambient light detected and measured by an ACS may originate from one or more lights sources, such as an incandescent light source 108, a natural light source 110 (e.g., sunlight or light reflected off the Moon), a light-emitting diode (LED) light source 112, a fluorescent tube light source 114, etc. The described technology can determine the presence and relative magnitude of light from such different light sources and adjust the color distribution in the display 106 of the electronic device 100 and/or the color distribution of light sensed by one or more light sensors of the electronic device 100. For example, a ratio of sensed light from an X color channel and a Z color channel (e.g., an X/Z or Z/X ratio) can allow a light classification subsystem to discern between a "cool" light source (e.g., a fluorescent tube light) in terms of color temperature) and a "warm" light source (e.g., an incandescent light). In another implementation, flicker frequencies of various light sources can be discerned by reducing the integration time of the ACS sensor 102, such as from a typical 100 msec integration time to below 5 msec (e.g., 0.1-1 msec)—measurements of sensed fluorescent tube lights exhibit characteristic oscillations at such short integration times as compared to sunlight, which exhibits no or at least negligible oscillations at such short integration times. In some implementations, the light source classification techniques described herein may be combined in parallel and/or in sequence to discriminate between multiple known light sources. In some cases, such combinations can increase the confidence in the classification compared to that of a single light source classification technique.

The operation of the display 106 in the electronic device 100 allows for color shifts in the content display in the display 106. For example, in some implementation, the electronic device 100 may shift from a warmer color distribution after sunrise and a cooler color distribution after sunrise to reduce visual fatigue and/or reduce blue-light induced melatonin blockage in a user near the user's bedtime. User experience can be enhanced by shifting color distribution based on the light sources generating the ambient light. For example, the display 106 can be adjusted for a user in a room with overhead fluorescent tube lights as compared to incandescent light bulbs or sunlight. Furthermore, the electronic device 100 may also include one or more light sensors (not shown), such as a video camera for videoconferences. Using the ACS sensor 102, the light classification subsystem 104 can adjust the measurements of the one or more light sensors (not shown) to account for changes in white balance, exposure, etc.

Figure 2:
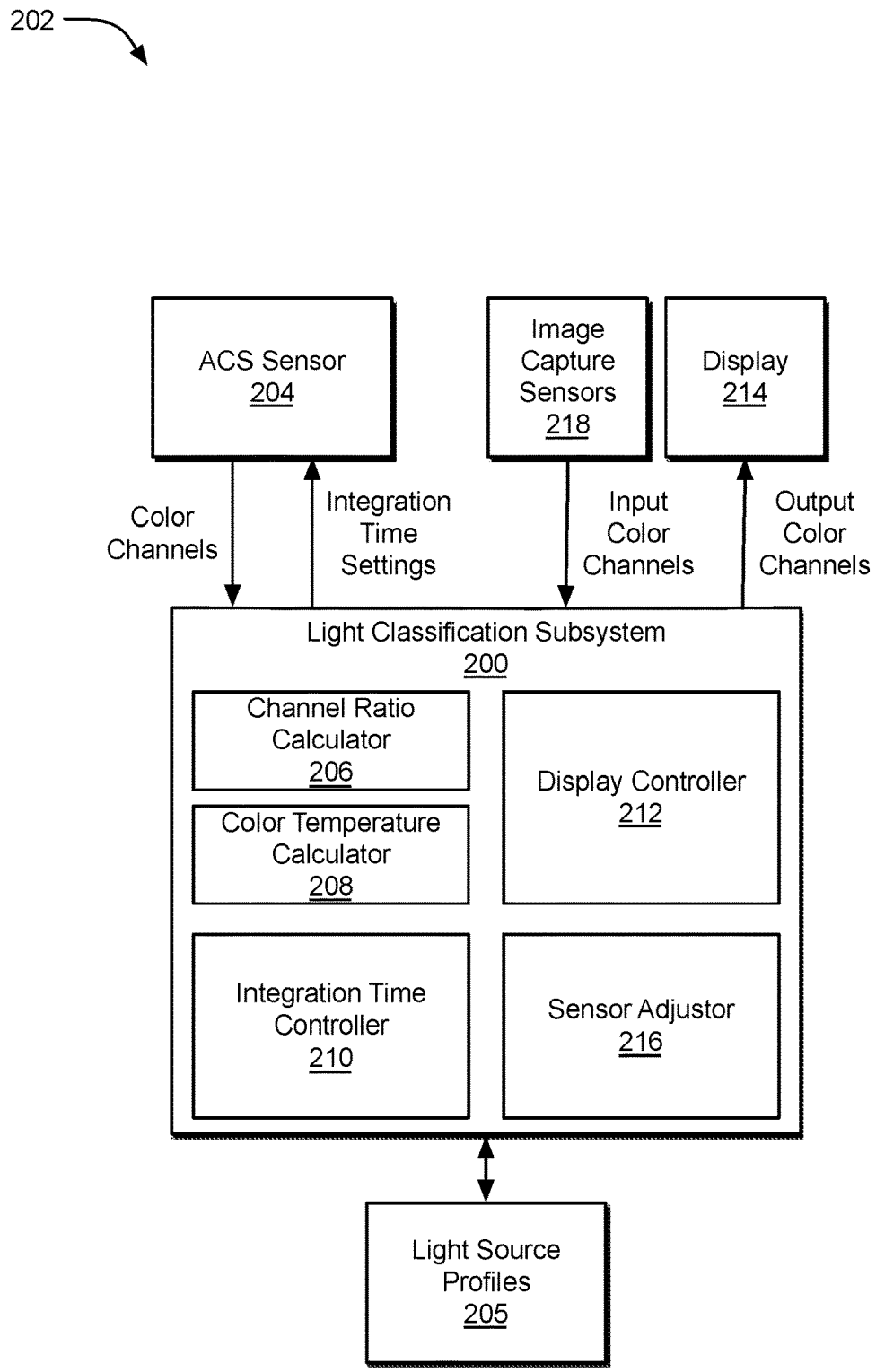
FIG. 2 illustrates an example light classification subsystem of an electronic device.

FIG. 2 illustrates an example light classification subsystem 200 of an electronic device 202. An ACS sensor 204 collects ambient light detected from the environment in which the electronic device 202 is positioned, which may include ambient light components from a variety of different light sources (not shown). In this context, ambient light refers to light in the environment that falls on or is detectable by a light sensor of the electronic device 202, whether natural or artificial. The intensity, color distribution, and/or amount of ambient light surrounding a workspace can affect the way colors are perceived on a computer's display. For example, bright ambient conditions can make the display look darker, with lower contrast, and lower-light ambient conditions will make the display seem brighter, with greater contrast. Furthermore, the color distribution and flicker behavior of different ambient light sources can lead to more or less clarity and/or vision fatigue experienced by a user of the display, for example.

In many implementations, ALS sensors and ACS sensors are made using photosensors/photodiodes that are covered by color filters (e.g., one or more organic material layers) that influence the sensor response. XYZ and RGB are different standards for color space, and some ALS/ACS sensors are designed according to the XYZ standard, and others are designed according to the RGB standard.

As shown in FIG. 2, color measurements (whether visible or invisible) of light detected by the ACS sensor 204 are communicated to the light classification subsystem 200 via distinct color channels. In at least one implementation, the color channels are mutually exclusive, in that the wavelengths of different channels are unique to each channel and do not overlap with the wavelengths of other channels (e.g., in some implementations in an RGB color space). However, some implementations may allocate color channels with overlapping, consolidated, or transformed color metrics (e.g., in some implementations in an XYZ color space). This flexibility allows for more accurate light source calculation using a variety of light and/or color sensors.

The measurement data received by the light classification subsystem 200 via the color channels is processed by one or more light classification techniques, which each of which may be used alone or in combination with another light classification technique. In one implementation, a channel ratio calculator 206 receives measurement data via the color channels and computes a ratio of one or more measurements from 2 different visible color channels (e.g., X/Z or Z/X in an XYZ color space). In this example, a Z/X ratio less than 0.3 is deemed to indicate a low color temperature light source, a ratio greater than 0.3 is deemed to indicate a high color temperature light source, and a ratio of 0.3 is deemed to indicate natural sunlight. These specific numerical limits are provided as examples only, and actual numerical limits may depend on system characteristics, such as the configuration of the optical stack of the sensor (e.g., glass+diffuser, glass+IR, ink, glass+other filter). Color temperature may be represented as a calibrated color temperature (CCT) or any other color temperature metric.

Another implementation, the channel ratio calculator 206 computes a ratio of one or more measurements from a visible color channel and an invisible color channel (e.g., IR/Y or Y/IR, wherein IR refers to an infrared color channel and Y is luminance (LUX) in an XYZ color space). In this example, a ratio less than 1.0 is deemed to indicate a low IR light source, a ratio greater than 1.0 is deemed to indicate a high IR light source, and a ratio of 1.0 is deemed to indicate natural sunlight. As with the visible color ratio (e.g., X/Z), a ratio of visible and invisible color channels can provide an alternative classification vector. Multiple classification techniques can be combined or even weight against each other when compared to corresponding light source profiles so as to more accurately classify the ambient light sources.

In another implementation, a color temperature calculator 208 receives measurement data via the color channels and computes a color temperature using these measurements. As with other light source classification techniques described herein, the color temperature-based classification technique can be used as a supplementary vector for classification and can increase or decrease the confidence in light source classification yielded by other vectors of classification. For example, in one implementation, the color temperature computation may approximate a calibrated color temperature (CCT) using the following formula, although other approximation formulas and color temperature curves may be employed to determine a color temperature from the color channel data:

$$n = \frac{(X - 0.3320)}{(0.1858 - Y)} \quad (1)$$

$$CCT = 437 \times n^3 + 3601 \times n^2 + 6861 \times n + 5517$$

In this example, a calculated CCT value less than or equal to 3500K is deemed to indicate a low color temperature light source, and a calculated CCT value greater than 3500K is deemed to indicate a high color temperature light source.

In another implementation, one or more conversion matrices (e.g., look-up tables) can be used to translate "sensor channels" (e.g., individual output channels of XYZIR, CRGB, CRGBW) into CIE XYZ space. Such a conversion matrix model can be achieved by training a model with training data from a large number of known light sources. Given a trained conversion matrix:

CIE XYZ=sensor channel(X,Y,Z,IR)×(conversion matrix), where "x" represents a multiplication operation. CIE XYZ can be translated to CCT, such as shown in Equation (1) above. Also, different classifier types (e.g., for rich or non-rich IR light, for high/low CCT light, for light flicker light sources) can be associated with different conversion matrices, which can then be used in combination for a broad range of light source classifications.

In such implementations, one or more indicated high/low color temperature or IR designations are evaluated against one or more light source profiles 205 that have been predefined to correspond to one or more of the supported light source types. For example, a computed high color temperature value may indicate a fluorescent tube or cool LED light source, a computed low color temperature value may indicate an incandescent, halogen, or warm LED light source, and a high IR light source may indicate a halogen or incandescent light source.

In another implementation, an integration time controller 210 adjusts the integration time of the ACS sensor 204 for a period of time, from a longer integration time (e.g., approximately 100 msec) to a shorter integration time (e.g., 0.1-10 msec) that quickly samples the impinging light so as to detect a high-frequency flicker of the light. When operating with the longer integration time, the ACS sensor 204 captures a large number of photons per each duty cycle and therefore is more sensitive in dim ambient light. In contrast, when operating with a shorter integration time, the ACS sensor 204 captures a smaller number of photos per each duty cycle and therefore is less sensitive in dim ambient light. However, the faster sampling also allows the ACS sensor 204 to detect high-frequency oscillations in light emitted by certain types of light sources (e.g., incandescent light bulbs with a flicker of 6.6%, CFL light bulbs with a flicker of 5.1%, ballasted-fluorescent tubes, with a flicker of 28.4%, LED light bulbs with a flicker of 54.7.6%, and natural sunlight with a flicker of 0%). The flicker percentages of the detected light can be compared to flicker profiles in the light source profiles 205 (e.g., stored in a profile datastore) to assist in classifying the light source.

It should be understood that one or more of the detected characteristics (e.g., color temperatures, IR rating, and flicker) may be evaluated against the light source profiles 205 to increase the confidence in the light source classification. For example, detection of a high flicker percentage using the shorter integration time in combination with detection of a high color temperature and high IR may indicate an ambient sunlight condition in which a flicker is induced by another light source or other effect.

In one implementation, one or more of the various light source classification techniques may be employed in parallel and/or in sequence, including calculating color temperature, computing visible light channel ratios, computing invisible/visible light channel ratios, detecting flicker frequencies, and performing various combination of classification using light channel values, flicker, and/or color temperature. For example, some combinations of light source classification techniques are more accurate in classifying natural sunlight as compared to classifying light from a fluorescent tube. Accordingly, in one implementation, a light source can be identified when one or more classification techniques indicate one type of light source over another with satisfactory confidence (e.g., a sufficient match to one or more profiles of a given type of light source).

Having identified one or more ambient light sources, a display controller 212 adjusts the color distribution supplied via output color channels and displayed on a display 214 of the electronic device 202. For example, in the case of ambient light dominated by light from a fluorescent tube, the display controller 212 may color shift the output of the display 214 toward warmer colors to enhance the clarity and reduce eye fatigue for a user.

Identification of a particular light source can initiate a display color shift toward the color temperature or predominate wavelengths of that light source to provoke a more natural response from the human eye. For example:

| Classified Light Source | Display Adjustment |
| --- | --- |
| Halogen (2700k) with 500 LUX | Display shifts brighter with warmer color |
| Fluorescent (5000k) with 500 LUX | Display shifts brighter with whiter color |
| 500 LUX reduces to 100 LUX | Display shifts dimmer |

Likewise, having identified one or more ambient light sources, a sensor adjustor 216 adjusts the color distribution received via input color channels from one or more image capture sensors 218 (or other types of light sensors) of the electronic device 202. For example, in the case of ambient light dominated by light from a fluorescent tube, the sensor adjustor 216 may shift the input colors from the image capture sensors 218 toward warmer colors to enhance the clarity and reduce eye fatigue for a user. In another implementation, the sensor adjustor 216 may communicate with the image capture sensors 218 to have them adjust their sensing operation with a color shift toward warmer colors in order to correct the white balance, exposure, or another visual characteristic in view of dominance by different lights sources. Such color shifts of light sensors can mimic the color adjustments made by human vision.

It should be understood that such ambient light detection, light source classification, display adjustment, and/or light sensor adjustment can be configured to occur dynamically over multiple time intervals during the operation of the electronic device 202. As such, if the electronic device 202 is initially operating in a room dominated by light from a fluorescent tube, and then the fluorescent tube is turned off, allowing domination by natural sunlight, then the color distribution displayed by the display 214 and/or the color balance sensed by the image capture sensors 218 may be adjusted dynamically as the new dominant light source type is identified.

Figure 3:
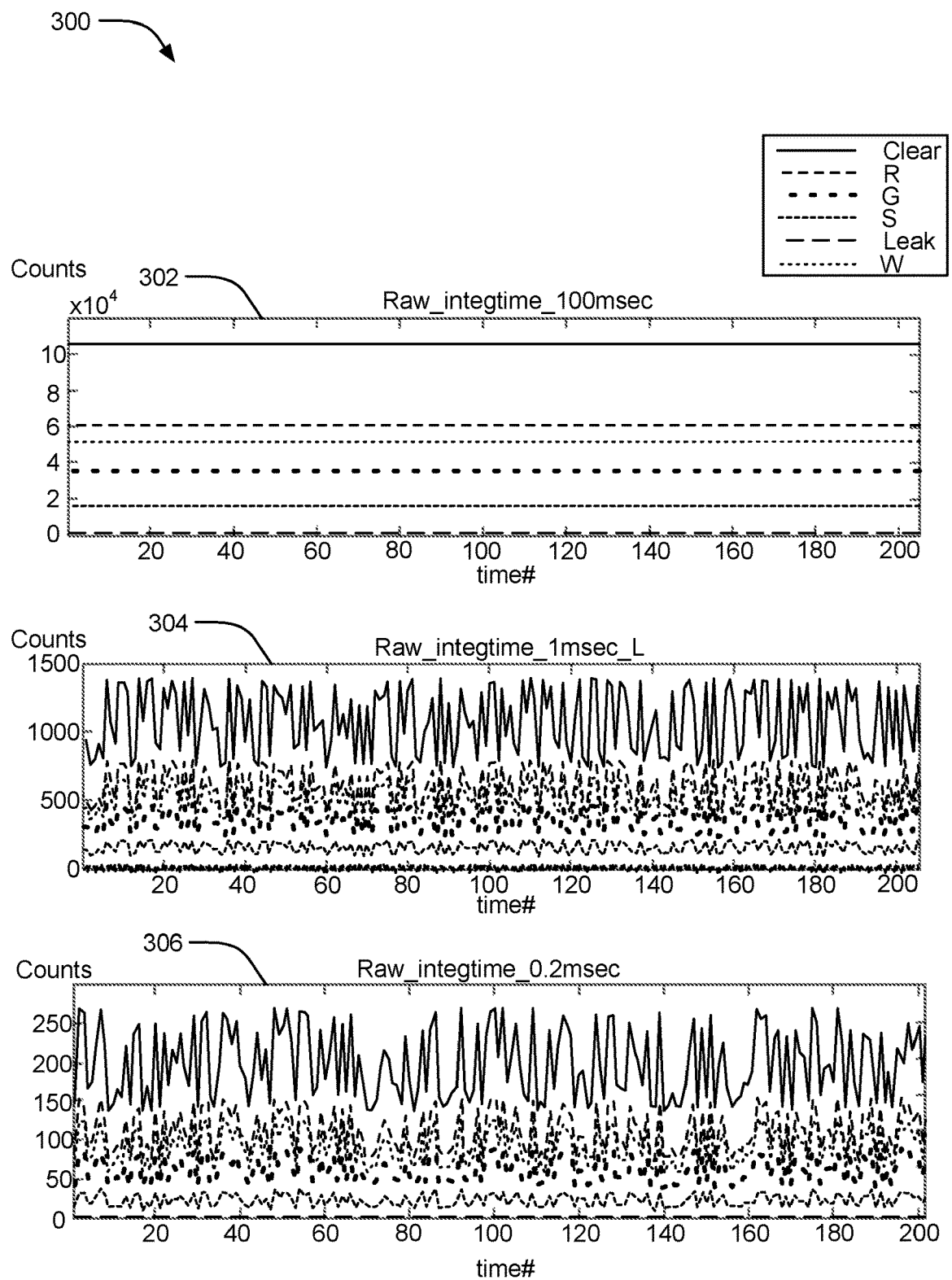
FIG. 3 illustrates sensed pulse-width-modulated pattern data for example light source classification using different sensor integration times.

FIG. 3 illustrates sensed pulse-width-modulated pattern data 300 for example light source classification using different sensor integration times. The color channels from the sensor are listed in the legend from top to bottom as clear (meaning visible wavelengths), R or Red, G or Green, B or Blue, Leak (meaning leakage between color channels), and W (meaning a wide filter covering wavelengths across visible and IR). A graph 302 illustrates sensed light data in multiple color channels using a sensor integration time of 100 msec. This integration time averages the sensor response so that oscillations in the color signals are not detected. In graph 302, working from top to bottom, the topmost color channel corresponds to Clear, followed by R, W, G, B, and Leak (at the bottom). Because the integration time is long enough to average out any inherent oscillations in the color channels, the graph lines are substantially flat. Note: The Leak channel is substantially independent of the integration time of the sensor.

Another graph 304 illustrates the sensed light data in multiple color channels using a sensor integration time of 1 msec. This shorter integration time does not average the sensed light data as much as shown in the graph 302. As such, oscillations in the color channels of the ambient light, except for the Leak channel, exhibit detectable oscillations, allowing for the measurement of the flicker percentage or frequency.

Likewise, another graph 306 illustrates the sensed light data in multiple color channels using a sensor integration time of 0.1 msec. This even shorter integration time does not average the sensed light data as much as shown in the graph 302. As such, oscillations in the color channels of the ambient light, except for the Leak channel, exhibit detectable oscillations, allowing for the measurement of the flicker percentage or frequency. It should be understood that the integration time at which the sensor is able to discern the oscillation in the color channels corresponds substantially to twice the frequency of the target flicker frequency, according to the Nyquist-Shannon sampling theorem:

If a function x(t) contains no frequencies higher than B hertz, it is completely determined by giving its ordinates at a series of points spaced 1/(2B)second apart.

Given this foundation, multiple integration times may be set progressively for the sensor to discern between two different flicker frequencies and, therefore, two different flickering lights sources. In one implementation, the pulse-width-modulated pattern data of graph 304 and/or graph 306 can be evaluated against predefined profiles of various light sources corresponding to the indicated integration times in order to discern between different light source types.

It should be understood that measurement of flicker frequency can differentiate between different light sources. For example, a fluorescent tube exhibits a flicker of 28.4%, whereas natural sunlight exhibits a flicker of 0% (at least not generally at frequencies measurable by the integration periods contemplated herein).

Figure 4:
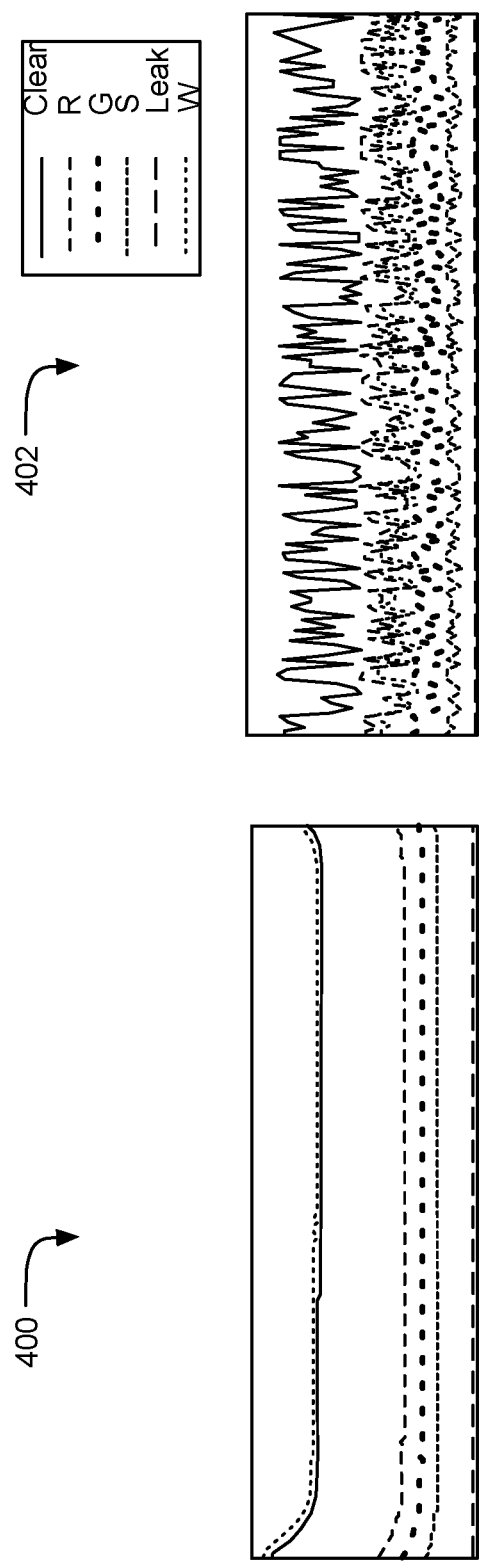
FIG. 4 illustrates example sensed pulse-width-modulated pattern data for different light sources using short sensor integration times.

FIG. 4 illustrates example sensed pulse-width-modulated pattern data for different light sources using short sensor integration times. The color channels are the same as indicated for FIG. 3. A graph 400 illustrates the substantially flat sensor response in multiple color channels for a natural sunlight source using a sensor integration time of 0.2 msec. In contrast, a graph 402 illustrates the oscillations or flicker detected in multiple color channels for a natural sunlight source using a sensor integration time of 0.2 msec. Accordingly, FIG. 4 illustrates the effectiveness of using a shorter integration time (e.g., one that complies with the Nyquist-Shannon sampling theorem to detect flicker at select frequencies. The detected frequencies can be evaluated against known frequency profiles of various light source types to identify the light sources generating the ambient light.

Figure 5:
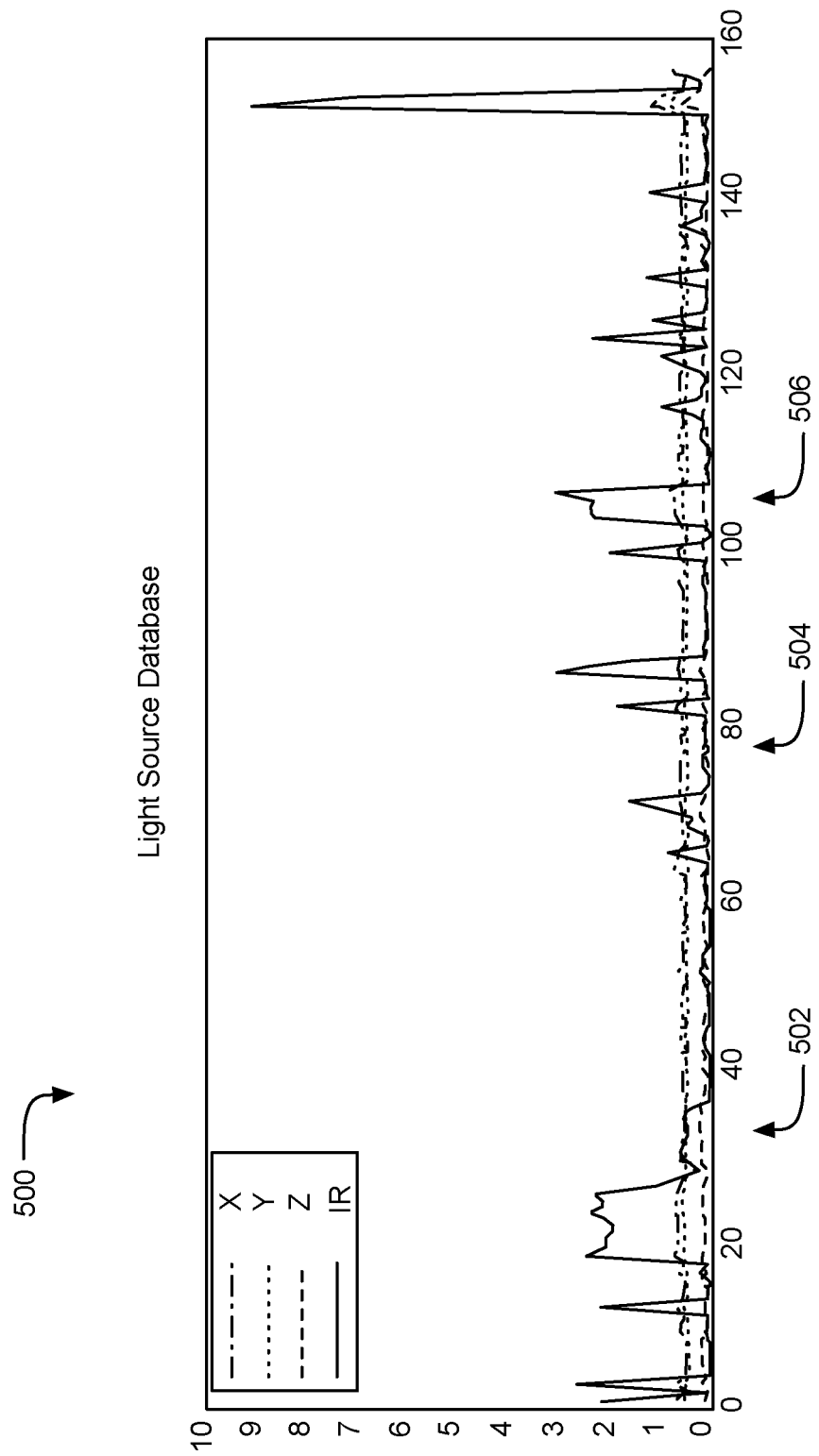
FIG. 5 illustrates sensed data for example light source classification based on a ratio of color channel measurements.

FIG. 5 illustrates sensed data 500 for example light source classification based on a ratio of color channel measurements. The color channels from the sensor are listed in the legend from top to bottom as X, Y, Z, and IR. The region indicated as region 502 shows that the ratio of IR to Y (or Y to IR) is substantially 1.0, indicating that the light source in this region of the light source profile datastore is natural sunlight. The region indicated as region 504 shows that the ratio of IR to Y is below 1.0, indicating that the light source in this region of the light source profile datastore is a low IR light source. The region indicated as region 506 shows that the ratio of IR to Y is above 1.0, indicating that the light source in this region of the light source profile datasource is a high IR light source.

Figure 6:
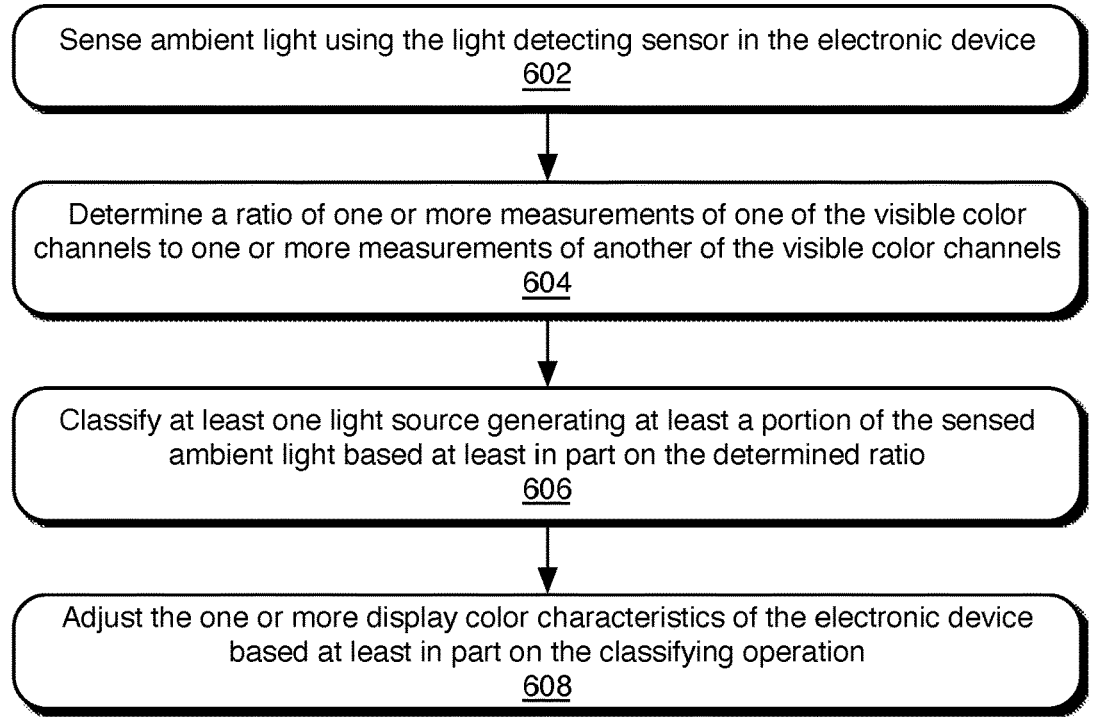
FIG. 6 illustrates example operations for performing light source classification based on a ratio involving one or more visible light measurements.

FIG. 6 illustrates example operations 600 for performing light source classification based on a ratio involving one or more visible light measurements. In one implementation, the operations manage one or more display color characteristics of an electronic device using a light detecting sensor configured to output multiple color channels in a predefined color space. A sensing operation 602 senses ambient light using the light detecting sensor in the electronic device. The light sensor outputs measurements in visible color channels of the predefined color space to characterize the sensed ambient light. In some implementations, the measurements may be output in a time-dependent sequence for each management evaluation, although a single measurement may be used for a management evaluation in some implementations. A calculation operation 604 determines a ratio of one or more measurements of one of the visible color channels to one or more measurements of another of the visible color channels. In one implementation, the ratio is based on one or more measurements from each of an X channel to a Z channel of an XYZ color space. Accordingly, by comparing a ratio of measurements from the X and Z channels to pre-characterized light source XZ ratio profiles for various light sources, the described technology provides an accurate light source classification for select types of light sources. When combined with other classification vectors described herein, a wide range of light sources can be accurately classified.

In an alternative implementation, the calculation operation 604, instead of or in addition to, determines a ratio of one or more measurements of one of the visible color channels to one or more measurements of an invisible color channel, such as a ratio of sensed IR light to visible luminance.

In another alternative implementation, another calculation operation computes the CCT of the sensed light based on one or more measurements of one of the visible color channels. In yet another alternative implementation, another calculation operation adjusts the integration time of the computes the light detecting sensor in the electronic device to yield oscillations in the ambient light based on one or more measurements of one of the visible color channels. In one implementation, the integration time is reduced below 10 msec. In other implementations, the integration time is reduced below 5 msec, below 1 msec, or down as low as 0.1 msec (below which the sensor may not be able to capture enough photons to generate a detectable signal). Nevertheless, the integration time may be reduced even lower in more photosensitive light detecting sensors. In one implementation, the integration time for such a pulse-width-modulated pattern is controlled by the Nyquist-Shannon sampling theorem.

A classification operation 606 classifies at least one light source generating at least a portion of the sensed ambient light based at least in part on the determined ratio of visible light channels. The determined ratio indicates a color temperature component of the sensed ambient light. In an alternative implementation, another classification operation classifies at least one light source generating at least a portion of the sensed ambient light based at least in part on a determined ratio of IR and luminance. In an alternative implementation, another classification operation classifies at least one light source generating at least a portion of the sensed ambient light based at least in part on an integration time capable of extracting oscillations in the ambient light, such as an integration time satisfying the Nyquist-Shannon sampling theorem.

Figure 7:
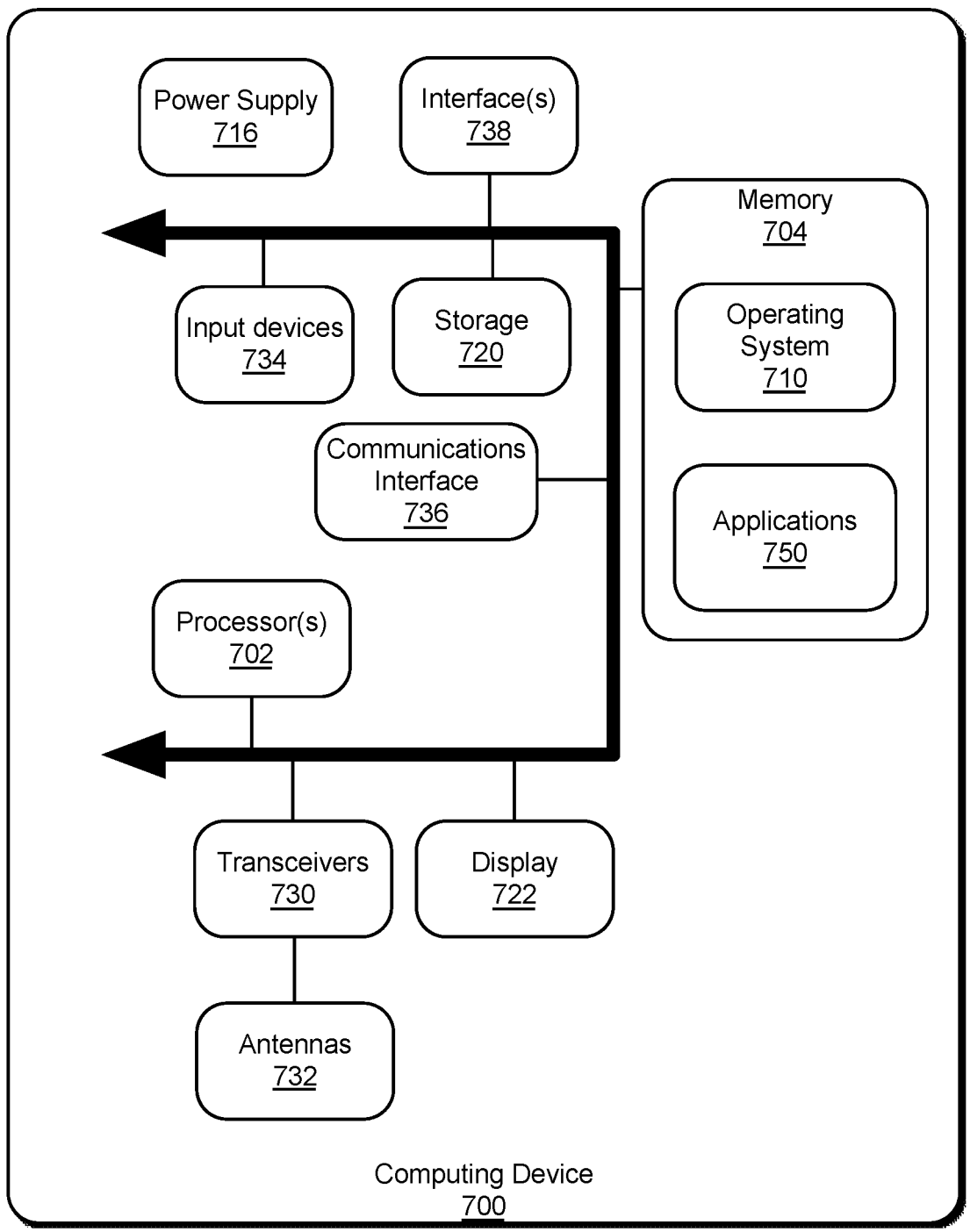
FIG. 7 illustrates an example computing device for use in classifying light sources in an electronic device.

An adjustment operation 608 adjusts the one or more display color characteristics of the electronic device based at least in part on the classifying operation. In an alternative or additional operation, another adjustment operation adjusts one or more sensor color characteristics of the electronic device based at least in part on one of the classifying operations FIG. 7 illustrates an example computing device for use in classifying light sources in an electronic device. The computing device 700 may be a client device, such as a laptop, mobile device, desktop, tablet, or a server/cloud device. The computing device 700 includes one or more processor(s) 702, and a memory 704. The memory 704 generally includes both volatile memory (e.g., RAM) and nonvolatile memory (e.g., flash memory). An operating system 710 resides in the memory 704 and is executed by the processor(s) 702.

In an example computing device 700, as shown in FIG. 7, one or more modules or segments, such as applications 750, all or part of a light classification subsystem, a channel ratio calculator, an integration time controller, a display controller, a sensor adjustor, and other modules are loaded into the operating system 710 on the memory 704 and/or storage 720 and executed by processor(s) 702. The storage 720 may store light source profiles, color channel data, integration time settings, sensor measurements, and other data and be local to the computing device 700 or may be remote and communicatively connected to the computing device 700. In one implementation, the display controller, the sensor controllers, a communications interface, and/or a timing generator may include circuitry to perform intended functions.

In particular, in one implementation, components of the light classification subsystem may be implemented entirely in hardware or in a combination of hardware circuitry and software.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a network adapter 736, which is a type of communication device. The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of managing one or more display color characteristics of an electronic device using a light detecting sensor configured to output multiple color channels in a predefined color space includes sensing ambient light using the light detecting sensor in the electronic device that outputs measurements in visible color channels of the predefined color space to characterize the sensed ambient light, determining a ratio of one or more measurements of one of the visible color channels to one or more measurements of another of the visible color channels, classifying at least one light source generating at least a portion of the sensed ambient light based at least in part on the determined ratio, wherein the determined ratio indicates a color temperature component of the sensed ambient light, and adjusting the one or more display color characteristics of the electronic device based at least in part on the classifying operation. One or more technical benefits of this method may include providing a more accurate and lower cost classification of ambient lights sources as compared to other methods.

Another example method of any preceding method is provided, wherein the measurements in the visible color channels of the predefined color space include tristimulus values representing distributions of wavelengths in a visible electromagnetic spectrum. One or more technical benefits of this method may include providing an accurate and low-cost classification of ambient lights sources using visible color channel output without the need for invisible color channel output.

Another example method of any preceding method is provided, wherein the predefined color space is the CIE 1931 XYZ color space, and the determined ratio includes a ratio of at least one X channel measurement from the light detecting sensor and at least one Z channel measurement from the light detecting sensor. One or more technical benefits of this method may include providing an accurate and low-cost classification of ambient lights sources using measurements from visible color channels in a standard color space without the need for invisible color channel output.

Another example method of any preceding method is provided, wherein the light detecting sensor in the electronic device is configured to output an invisible color channel in an infrared frequency band and a luminance channel, and the determined ratio includes a ratio of at least one invisible color channel measurement from the light detecting sensor and at least one luminance channel measurement from the light detecting sensor. One or more technical benefits of this method may include providing a more accurate and lower cost classification of ambient lights sources as compared to other methods—multiple classification methods and measurement types can be used in combination to provide more accurate results as compared to a single classification method and measurement type.

Another example method of any preceding method is provided, further including setting an integration time of the light detecting sensor to less than ten milliseconds for use in the sensing operation and capturing a detected pulse-width-modulation (PWM) profile of the measurements performed at the set integration time over a predefined period of time in one or more color channels output by the light detecting sensor. The classifying operation includes classifying at least one light source generating at least a portion of the sensed ambient light based at least in part on the detected PWM profile and one or more predefined PWM profiles of one or more different light sources. One or more technical benefits of this method may include providing a more accurate and lower cost classification of ambient lights sources by detecting flicker in the measured light.

Another example method of any preceding method is provided, wherein the predefined color space is the CIE 1931 XYZ color space. The example method includes determining a calibrated color temperature based on at least one X channel measurement from the light detecting sensor and at least one luminance channel measurement from the light detecting sensor, wherein the classifying operation includes classifying at least one light source generating at least a portion of the sensed ambient light based at least in part on the determined calibrated color temperature. One or more technical benefits of this method may include providing a more accurate and lower cost classification of ambient lights sources as compared to other methods—multiple classification methods and measurement types can be used in combination to provide more accurate results as compared to a single classification method and measurement type.

Another example method of any preceding method is provided, further including setting an integration time of the light detecting sensor to less than ten milliseconds for use in the sensing operation and capturing a detected pulse-width-modulation (PWM) profile of the measurements performed at the set integration time over a predefined period of time in one or more color channels output by the light detecting sensor. The classifying operation includes classifying at least one light source generating at least a portion of the sensed ambient light based at least in part on the detected PWM profile and one or more predefined PWM profiles of one or more different light sources. One or more technical benefits of this method may include providing a more accurate and lower cost classification of ambient lights sources as compared to other methods—multiple classification methods and measurement types can be used in combination to provide more accurate results as compared to a single classification method and measurement type.

An example system for managing one or more display color characteristics of an electronic device is provided, including one or more hardware processors, a light detecting sensor configured to sense ambient light and to output measurements in visible color channels of a predefined color space to characterize the sensed ambient light, a ratio generation subsystem executable by the one or more hardware processors and configured to determine a ratio of one or more measurements of one of the visible color channels to one or more measurements of another of the visible color channels, a light source classifier executable by the one or more hardware processors and configured to classify at least one light source generating at least a portion of the sensed ambient light based at least in part on the determined ratio, wherein the determined ratio indicates a color temperature component of the sensed ambient light, and a display adjuster executable by the one or more hardware processors and configured to adjust the one or more display color characteristics of the electronic device based at least in part on the classification.

Another example system of any previous system is provided, wherein the predefined color space is the CIE 1931 XYZ color space, and the determined ratio includes a ratio of at least one X channel measurement from the light detecting sensor and at least one Z channel measurement from the light detecting sensor.

Another example system of any previous system is provided, wherein the predefined color space is the CIE 1931 XYZ color space, and further including a color temperature estimator executable by the one or more hardware processors and configured to determine a calibrated color temperature based on at least one X channel measurement from the light detecting sensor and at least one luminance channel measurement from the light detecting sensor and the light source classifier is further configured to classify at least one light source generating at least a portion of the sensed ambient light based at least in part on the determined calibrated color temperature.

Another example system of any previous system is provided, wherein the light detecting sensor is further configured to output an invisible color channel in an infrared frequency band and a luminance channel, and the determined ratio includes a ratio of at least one invisible color channel measurement from the light detecting sensor and at least one luminance channel measurement from the light detecting sensor.

Another example system of any previous system is provided, further including a sensor integration time adjustor executable by the one or more hardware processors and configured to set an integration time of the light detecting sensor to less than ten milliseconds and a pulse-width-modulation (PWM) capture system executable by the one or more hardware processors and configured to capture a detected PWM profile of the measurements performed at the set integration time over a predefined period of time in one or more color channels output by the light detecting sensor, wherein the light source classifier is further configured to classify at least one light source generating at least a portion of the sensed ambient light based at least in part on the detected PWM profile and one or more predefined PWM profiles of one or more different light sources.

Another example system of any previous system is provided, wherein the predefined color space is the CIE 1931 XYZ color space and further including a calibrated color temperature calculator executable by the one or more hardware processors and configured to determine a calibrated color temperature based on at least one X channel measurement from the light detecting sensor and at least one luminance channel measurement from the light detecting sensor, wherein the light source classifier is further configured to classify at least one light source generating at least a portion of the sensed ambient light based at least in part on the determined calibrated color temperature.

Another example system of any previous system is provided, further including a sensor integration time adjustor executable by the one or more hardware processors and configured to set an integration time of the light detecting sensor to less than ten milliseconds for use in the sensing and a pulse-width-modulation (PWM) capture system executable by the one or more hardware processors and configured to capture a detected pulse-width-modulation (PWM) profile of the measurements performed at the set integration time over a predefined period of time in one or more color channels output by the light detecting sensor, wherein the light source classifier is further configured to classify at least one light source generating at least a portion of the sensed ambient light based at least in part on the detected PWM profile and one or more predefined PWM profiles of one or more different light sources.

One or more example tangible processor-readable storage media are provided, embodied with instructions for executing on one or more processors and circuits of a computing device a process for managing one or more display color characteristics of an electronic device using a light detecting sensor configured to output multiple color channels in a predefined color space. The process includes sensing ambient light using the light detecting sensor in the electronic device that outputs measurements in visible color channels of the predefined color space to characterize the sensed ambient light, determining a ratio of one or more measurements of one of the visible color channels to one or more measurements of another of the visible color channels, classifying at least one light source generating at least a portion of the sensed ambient light based at least in part on the determined ratio, wherein the determined ratio indicates a color temperature component of the sensed ambient light, and adjusting the one or more display color characteristics of the electronic device based at least in part on the classifying operation.

One or more additional example tangible processor-readable storage media of any preceding media are provided, wherein the predefined color space is the CIE 1931 XYZ color space, and the determined ratio includes a ratio of at least one X channel measurement from the light detecting sensor and at least one Z channel measurement from the light detecting sensor.

One or more additional example tangible processor-readable storage media of any preceding media are provided, wherein the light detecting sensor in the electronic device is configured to output an invisible color channel in an infrared frequency band and a luminance channel, and the determined ratio includes a ratio of at least one invisible color channel measurement from the light detecting sensor and at least one luminance channel measurement from the light detecting sensor.

One or more additional example tangible processor-readable storage media of any preceding media are provided, wherein the process further includes setting an integration time of the light detecting sensor to less than ten milliseconds for use in the sensing operation and capturing a detected pulse-width-modulation (PWM) profile of the measurements performed at the set integration time over a predefined period of time in one or more color channels output by the light detecting sensor. The classifying operation includes classifying at least one light source generating at least a portion of the sensed ambient light based at least in part on the detected PWM profile and one or more predefined PWM profiles of one or more different light sources.

One or more additional example tangible processor-readable storage media of any preceding media are provided, wherein the predefined color space is the CIE 1931 XYZ color space, and the process further includes determining a calibrated color temperature based on at least one X channel measurement from the light detecting sensor and at least one luminance channel measurement from the light detecting sensor. The classifying operation includes classifying at least one light source generating at least a portion of the sensed ambient light based at least in part on the determined calibrated color temperature.

One or more additional example tangible processor-readable storage media of any preceding media are provided, wherein the process further includes setting an integration time of the light detecting sensor to less than ten milliseconds for use in the sensing operation and capturing a detected pulse-width-modulation (PWM) profile of the measurements performed at the set integration time over a predefined period of time in one or more color channels output by the light detecting sensor. The classifying operation includes classifying at least one light source generating at least a portion of the sensed ambient light based at least in part on the detected PWM profile and one or more predefined PWM profiles of one or more different light sources.

An example system for managing one or more display color characteristics of an electronic device using a light detecting sensor configured to output multiple color channels in a predefined color space includes means for sensing ambient light using the light detecting sensor in the electronic device that outputs measurements in visible color channels of the predefined color space to characterize the sensed ambient light, means for determining a ratio of one or more measurements of one of the visible color channels to one or more measurements of another of the visible color channels, means for classifying at least one light source generating at least a portion of the sensed ambient light based at least in part on the determined ratio, wherein the determined ratio indicates a color temperature component of the sensed ambient light, and means for adjusting the one or more display color characteristics of the electronic device based at least in part on the means for classifying.

Another example system of any preceding system is provided, wherein the measurements in the visible color channels of the predefined color space include tristimulus values representing distributions of wavelengths in a visible electromagnetic spectrum.

Another example system of any preceding system is provided, wherein the predefined color space is the CIE 1931 XYZ color space, and the determined ratio includes a ratio of at least one X channel measurement from the light detecting sensor and at least one Z channel measurement from the light detecting sensor.

Another example system of any preceding system is provided, wherein the light detecting sensor in the electronic device is configured to output an invisible color channel in an infrared frequency band and a luminance channel, and the determined ratio includes a ratio of at least one invisible color channel measurement from the light detecting sensor and at least one luminance channel measurement from the light detecting sensor.

Another example system of any preceding system is provided, further including means for setting an integration time of the light detecting sensor to less than ten milliseconds for use in the sensing operation and capturing a detected pulse-width-modulation (PWM) profile of the measurements performed at the set integration time over a predefined period of time in one or more color channels output by the light detecting sensor. The means for classifying include means for classifying at least one light source generating at least a portion of the sensed ambient light based at least in part on the detected PWM profile and one or more predefined PWM profiles of one or more different light sources.

Another example system of any preceding system is provided, wherein the predefined color space is the CIE 1931 XYZ color space. The example system includes means for determining a calibrated color temperature based on at least one X channel measurement from the light detecting sensor and at least one luminance channel measurement from the light detecting sensor, wherein the means for classifying includes means for classifying at least one light source generating at least a portion of the sensed ambient light based at least in part on the determined calibrated color temperature.

Another example system of any preceding system is provided, further including means for setting an integration time of the light detecting sensor to less than ten milliseconds for use in the sensing operation and means for capturing a detected pulse-width-modulation (PWM) profile of the measurements performed at the set integration time over a predefined period of time in one or more color channels output by the light detecting sensor. The means for classifying includes means for classifying at least one light source generating at least a portion of the sensed ambient light based at least in part on the detected PWM profile and one or more predefined PWM profiles of one or more different light sources.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of managing one or more display color characteristics of an electronic device using a light detecting sensor configured to output multiple color channels in a predefined color space, the method comprising:
sensing ambient light using the light detecting sensor in the electronic device that outputs measurements in visible color channels of the predefined color space to characterize the sensed ambient light;
determining a ratio of one or more measurements of one of the visible color channels to one or more measurements of another of the visible color channels;
classifying at least one light source generating at least a portion of the sensed ambient light based at least in part on the determined ratio, wherein the determined ratio indicates a color temperature component of the sensed ambient light; and adjusting the one or more display color characteristics of the electronic device based at least in part on the at least one light source classified in the sensed ambient light.

2. The method of claim 1, wherein the measurements in the visible color channels of the predefined color space include tristimulus values representing distributions of wavelengths in a visible electromagnetic spectrum.

3. The method of claim 1, wherein the predefined color space is the CIE 1931 XYZ color space, and the determined ratio includes a ratio of at least one X channel measurement from the light detecting sensor and at least one Z channel measurement from the light detecting sensor.

4. The method of claim 1, wherein the light detecting sensor in the electronic device is configured to output an invisible color channel in an infrared frequency band and a luminance channel, and the determined ratio includes a ratio of at least one invisible color channel measurement from the light detecting sensor and at least one luminance channel measurement from the light detecting sensor.

5. The method of claim 4, further comprising:

setting an integration time of the light detecting sensor to less than ten milliseconds for use in the sensing operation; and capturing a detected pulse-width-modulation (PWM) profile of the measurements performed at the set integration time over a predefined period of time in one or more color channels output by the light detecting sensor, wherein the classifying operation comprises:

classifying at least one light source generating at least a portion of the sensed ambient light based at least in part on the detected PWM profile and one or more predefined PWM profiles of one or more different light sources.

6. The method of claim 1, wherein the predefined color space is the CIE 1931 XYZ color space, and further comprising:

determining a calibrated color temperature based on at least one X channel measurement from the light detecting sensor and at least one luminance channel measurement from the light detecting sensor, wherein the classifying operation comprises:

classifying at least one light source generating at least a portion of the sensed ambient light based at least in part on the determined calibrated color temperature.

7. The method of claim 6, further comprising:

setting an integration time of the light detecting sensor to less than ten milliseconds for use in the sensing operation; and classifying a detected pulse-width-modulation (PWM) profile of the measurements performed at the set integration time over a predefined period of time in one or more color channels output by the light detecting sensor, wherein the classifying operation comprises:

classifying at least one light source generating at least a portion of the sensed ambient light based at least in part on the detected PWM profile and one or more predefined PWM profiles of one or more different light sources.

8. A system for managing one or more display color characteristics of an electronic device, the system comprising:

one or more hardware processors;

a light detecting sensor configured to sense ambient light and to output measurements in visible color channels of a predefined color space to characterize the sensed ambient light;

a ratio generation subsystem executable by the one or more hardware processors and configured to determine a ratio of one or more measurements of one of the visible color channels to one or more measurements of another of the visible color channels;

a light source classifier executable by the one or more hardware processors and configured to classify at least one light source generating at least a portion of the sensed ambient light based at least in part on the determined ratio, wherein the determined ratio indicates a color temperature component of the sensed ambient light; and a display adjuster executable by the one or more hardware processors and configured to adjust the one or more display color characteristics of the electronic device based at least in part on the at least one light source classified in the sensed ambient light.

9. The system of claim 8, wherein the predefined color space is the CIE 1931 XYZ color space, and the determined ratio includes a ratio of at least one X channel measurement from the light detecting sensor and at least one Z channel measurement from the light detecting sensor.

10. The system of claim 8, wherein the predefined color space is the CIE 1931 XYZ color space, and further comprising:

a color temperature estimator executable by the one or more hardware processors and configured to determine a calibrated color temperature based on at least one X channel measurement from the light detecting sensor and at least one luminance channel measurement from the light detecting sensor and the light source classifier is further configured to classify at least one light source generating at least a portion of the sensed ambient light based at least in part on the determined calibrated color temperature.

11. The system of claim 8, wherein the light detecting sensor is further configured to output an invisible color channel in an infrared frequency band and a luminance channel, and the determined ratio includes a ratio of at least one invisible color channel measurement from the light detecting sensor and at least one luminance channel measurement from the light detecting sensor.

12. The system of claim 11, further comprising:

a sensor integration time adjustor executable by the one or more hardware processors and configured to set an integration time of the light detecting sensor to less than ten milliseconds; and a pulse-width-modulation (PWM) capture system executable by the one or more hardware processors and configured to capture a detected PWM profile of the measurements performed at the set integration time over a predefined period of time in one or more color channels output by the light detecting sensor, wherein the light source classifier is further configured to classify at least one light source generating at least a portion of the sensed ambient light based at least in part on the detected PWM profile and one or more predefined PWM profiles of one or more different light sources.

13. The system of claim 8, wherein the predefined color space is the CIE 1931 XYZ color space and further comprising:
a calibrated color temperature calculator executable by the one or more hardware processors and configured to determine a calibrated color temperature based on at least one X channel measurement from the light detecting sensor and at least one luminance channel measurement from the light detecting sensor, wherein the light source classifier is further configured to classify at least one light source generating at least a portion of the sensed ambient light based at least in part on the determined calibrated color temperature.

14. The system of claim 13, further comprising:
a sensor integration time adjustor executable by the one or more hardware processors and configured to set an integration time of the light detecting sensor to less than ten milliseconds for use in the sensing; and
a pulse-width-modulation (PWM) capture system executable by the one or more hardware processors and configured to capture a detected pulse-width-modulation (PWM) profile of the measurements performed at the set integration time over a predefined period of time in one or more color channels output by the light detecting sensor, wherein the light source classifier is further configured to classify at least one light source generating at least a portion of the sensed ambient light based at least in part on the detected PWM profile and one or more predefined PWM profiles of one or more different light sources.

15. One or more tangible processor-readable storage media embodied with instructions for executing on one or more processors and circuits of a computing device a process for managing one or more display color characteristics of an electronic device using a light detecting sensor configured to output multiple color channels in a predefined color space, the process comprising:
sensing ambient light using the light detecting sensor in the electronic device that outputs measurements in visible color channels of the predefined color space to characterize the sensed ambient light;
determining a ratio of one or more measurements of one of the visible color channels to one or more measurements of another of the visible color channels;
classifying at least one light source generating at least a portion of the sensed ambient light based at least in part on the determined ratio, wherein the determined ratio indicates a color temperature component of the sensed ambient light; and
adjusting the one or more display color characteristics of the electronic device based at least in part on the at least one light source classified in the sensed ambient light.

16. The one or more tangible processor-readable storage media of claim 15, wherein the predefined color space is the CIE 1931 XYZ color space, and the determined ratio includes a ratio of at least one X channel measurement from the light detecting sensor and at least one Z channel measurement from the light detecting sensor.

17. The one or more tangible processor-readable storage media of claim 15, wherein the light detecting sensor in the electronic device is configured to output an invisible color channel in an infrared frequency band and a luminance channel, and the determined ratio includes a ratio of at least one invisible color channel measurement from the light detecting sensor and at least one luminance channel measurement from the light detecting sensor.

18. The one or more tangible processor-readable storage media of claim 17, wherein the process further comprises:
setting an integration time of the light detecting sensor to less than ten milliseconds for use in the sensing operation; and
capturing a detected pulse-width-modulation (PWM) profile of the measurements performed at the set integration time over a predefined period of time in one or more color channels output by the light detecting sensor, wherein the classifying operation comprises:
classifying at least one light source generating at least a portion of the sensed ambient light based at least in part on the detected PWM profile and one or more predefined PWM profiles of one or more different light sources.

19. The one or more tangible processor-readable storage media of claim 15, wherein the predefined color space is the CIE 1931 XYZ color space, and wherein the process further comprises:
determining a calibrated color temperature based on at least one X channel measurement from the light detecting sensor and at least one luminance channel measurement from the light detecting sensor, wherein the classifying operation comprises:
classifying at least one light source generating at least a portion of the sensed ambient light based at least in part on the determined calibrated color temperature.

20. The one or more tangible processor-readable storage media of claim 19, wherein the process further comprises:
setting an integration time of the light detecting sensor to less than ten milliseconds for use in the sensing operation; and
capturing a detected pulse-width-modulation (PWM) profile of the measurements performed at the set integration time over a predefined period of time in one or more color channels output by the light detecting sensor, wherein the classifying operation comprises:
classifying at least one light source generating at least a portion of the sensed ambient light based at least in part on the detected PWM profile and one or more predefined PWM profiles of one or more different light sources.

\* \* \* \* \*